Aug. 20, 1963    A. V. JONASSON    3,100,934
PIPE CUTTER
Filed July 3, 1962
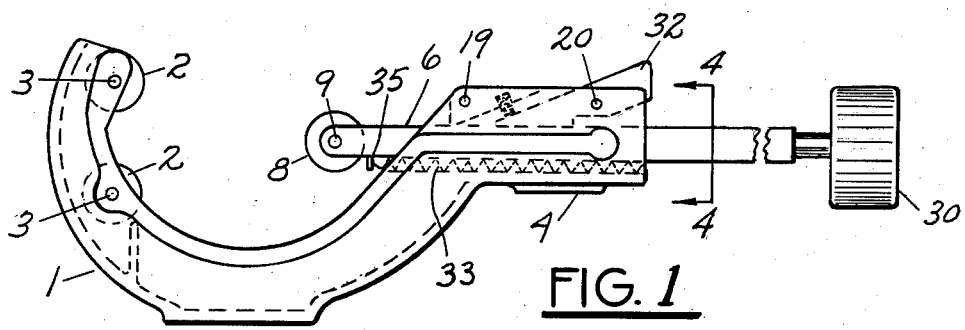
FIG. 1
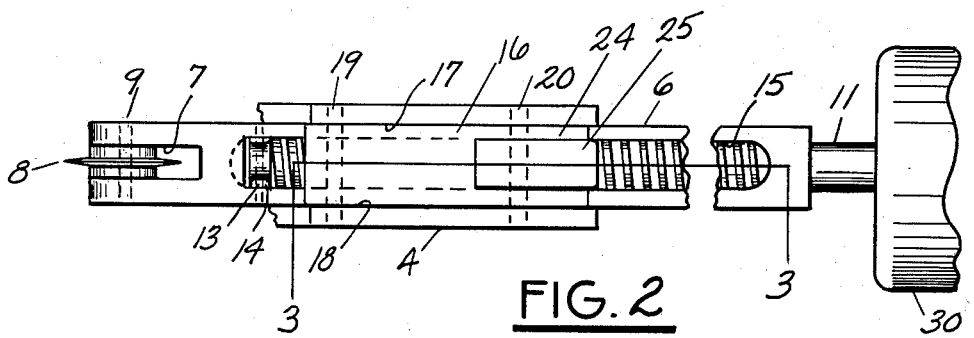
FIG. 2
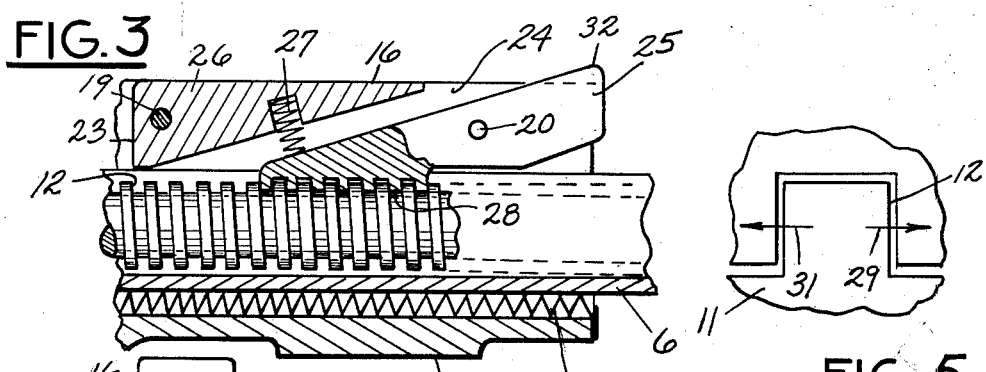
FIG. 3
FIG. 5
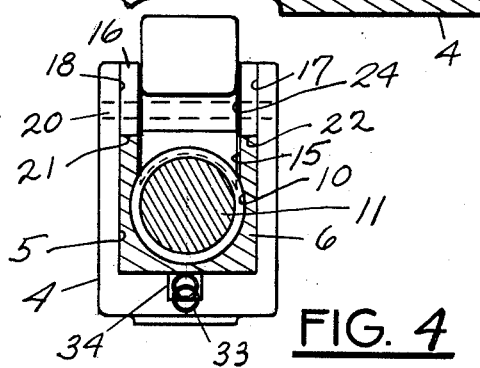
FIG. 4
INVENTOR.
Axel V. Jonasson
BY Ralph Hammar
attorney 3,100,934
PIPE CUTTER
Axel V. Jonasson, Erie, Pa., assignor to Reed Manufacturing Company, Erie, Pa., a corporation of Pennsylvania
Filed July 3, 1962, Ser. No. 207,222
8 Claims. (Cl. 30—102)

This invention is a pipe cutter which is quickly set to different sizes of pipe and in which the pressure screw need be turned only to apply the cutting pressure.

In the drawing, FIG. 1 is a side elevation of a pipe cutter, FIG. 2 is a top plan view of the end of the frame carrying the cutting wheel, FIG. 3 is a section on line 3—3 of FIG. 2, FIG. 4 is a section on line 4—4 of FIG. 1, and FIG. 5 is a diagram of the forces exerted by the pressure screw on the associated pawl.

The cutter has a C-shape frame 1 of channel-shaped cross section having at one end rolls 2 journaled on pins 3 and having at the other end a section 4 with a guideway 5 for a slide bar 6. At the front end of the bar is a slot 7 receiving a cutting wheel 8 journaled on a pin 9 extending across the sides of the slot. The pipe to be cut is cradled on the rolls 2 with the axis of the pipe at right angles to the slide 6 and the guideway 5 for the slide is oriented so that the force exerted by the cutting wheel on the pipe always extends along an axis between the rolls 2. The parts so far described are or may be of common construction.

The slide 6 has a bore 10 for a pressure screw 11 preferably having a thread of the square or acme or buttress shape having an abrupt shoulder 12 facing away from the cutting wheel. The pressure screw is freely rotatable in the bore 10 and is held therein by a pin 13 fitting in an annular groove 14 in the inner end of the pressure screw. The pin 13 holds the pressure screw in assembled relation but does not take any of the operating thrusts. The cutting pressure is transmitted by the inner end of the pressure screw directly to the slide 6. The top wall of the slide has an elongated slot 15 exposing the major part of the threaded length of the pressure screw. On top of the slide is a channel shaped member 16 fitting between the sides 17 and 18 of the section 4 of the frame and secured thereto by pins 19 and 20. When secured in place, the lower edges 21 and 22 engage opposite sides of the top of the slide 6 and serve as guides. The front end of the member 16 is suitably closed by a downwardly extending portion 23. The back end of the member 16 is cut away to provide a slot 24 receiving a pawl 25 pivoted on the pin 20. The forward end 26 of the pawl is urged downward by a spring 27 and has a threaded section 28 cooperating with the threads of the pressure screw. Under cutting conditions, the pressure between the cutting wheel 8 and the pipe exerts a force in the direction of arrow 29 tending to pivot the pawl 25 in a counterclockwise direction about the pin 20 and thereby hold the threaded section 28 of the pawl in engagement with the threads of the pressure screw. Any force on the pressure screw in the direction of arrow 29, whether originating at the cutting wheel 8 or by an outward pull on the handle 30 of the pressure screw, has the same effect of holding the threaded section 28 in engagement with the pressure screw. A force in the opposite direction, that is in the direction of arrow 31, would tend to pivot the pawl in the clockwise direction and thereby move the threaded section 28 of the pawl out of engagement with the pressure screw. This means that an inward push on the handle 30 of the pressure screw will move the cutting wheel 8 inward until the cutting wheel encounters sufficient resistance by contact with the tubing to overcome the force in the direction of the arrow 31. At this point, the threaded section 28 of the pawl will be moved by the spring 27 into engagement with the pressure screw.

The back end 32 of the pawl projects upwardly to an accessible position. A downward force on the back end of the pawl lifts the threaded section 28 of the pawl away from the pressure screw and permits a coil spring 33 arranged in a groove 34 in the frame to urge the bar to the right as viewed in FIG. 1. The back end of the spring 33 is anchored to the frame 1 and the front end of the spring is anchored to a pin 35 on the bar 6.

In the use of the cutter, the pipe is cradled between the rolls 2 and the handle 30 is pushed inward until the cutting wheel 8 contacts the pipe. During this inward movement of the cutting wheel, the threaded section 28 of the pawl 25 ratchets over the threads of the pressure screw. The force exerted by the pressure screw is in the direction of the arrow 31 tending to overcome the spring 27 and lift the threaded section 28 of the pawl away from the pressure screw. When the cutting wheel 8 contacts the tubing, further advance of the cutting wheel to develop the desired cutting pressure is through turning of the screw by the handle 30. The cutting pressure causes a force in the direction of arrow 29 which pivots the threaded section of the pawl into engagement with the pressure screw. Upon completion of the cut, downward pressure on the outer end 32 of the pawl releases the pawl and permits free separating movement of the cutting wheel away from the pipe.

The pressure screw need be turned only to develop and maintain the pressure between the cutting wheel and the pipe. At no time is it necessary to back off or unscrew the pressure screw.

The cutter produces an accurate cut, even when there is considerable clearance between the slide bar 6 and the associated guideway 5 in the cutter frame. First, the pin 9 can be accurately located so that the cutting edge of the cutting wheel lies in a plane parallel to the sides of the slide 6. Second, the sides 5 of the guideway are easily machined so as to be parallel to the plane of the cutting edge of the cutting wheel and perpendicular to the axes of the rolls 2. Finally, the cutting pressure takes up any clearance between the slide 6 and the associated guideway so that even though an appreciable clearance appears when the cutter is not being used, the operating thrusts take up this clearance.

What is claimed as new is:

1. A pipe cutter having a frame with means for guiding the cutter for relative rotation with respect to the pipe in a plane perpendicular to the longitudinal axis of the pipe, a wheel having a cutting edge in said plane, a slide guided in said frame for movement toward and away from the pipe and carrying the wheel on the end adjacent the pipe, a pressure screw journaled in and in thrust relation to said slide, a pawl, a pivot for the pawl on the frame on an axis intermediate the ends of the pressure screw and crosswise of the pressure screw, said pawl having a threaded end extending forward of its pivot, said slide having a longitudinal slot receiving the threaded end of the pawl and exposing a segment of the thread of the pressure screw, means urging the threaded end of the pawl into engagement with the pressure screw, and provisions for pivoting the threaded end of the pawl away from the pressure screw.

2. A pipe cutter having a frame with means for guiding the cutter for relative rotation with respect to the pipe in a plane perpendicular to the longitudinal axis of the pipe, a wheel having a cutting edge in said plane, a slide guided in the frame for movement toward and away from the pipe, means mounting the wheel on the end of the slide adjacent the pipe, spring means urging the slide in the direction to move the wheel away from the pipe, a pressure screw journaled in the slide and having its outer end provided with a handle and its inner end in thrust relation to said slide, a pawl, a pivot for the pawl on the frame on an axis crosswise of the pressure screw, said pawl having a threaded end extending forward of the pivot, means urging the threaded end of the pawl into engagement with the pressure screw, and provisions for pivoting the threaded end of the pawl away from the pressure screw.

3. A pipe cutter having a frame with means for guiding the cutter for relative rotation with respect to the pipe in a plane perpendicular to the longitudinal axis of the pipe, a wheel having a cutting edge in said plane, a slide guided in the frame for movement toward and away from the pipe, ratchet means for controlling the movement of the slide, said ratchet means comprising a pressure screw journaled in and in thrust relation to the slide with a handle for turning the same and a pawl engaging the threads of the pressure screw and oriented to yield freely to forces on the pressure screw toward the pipe and to hold against forces on the pressure screw away from the pipe.

4. A pipe cutter having a frame with means for guiding the cutter for relative rotation with respect to the pipe in a plane perpendicular to the longitudinal axis of the pipe, a wheel having a cutting edge in said plane, a slide guided in the frame for movement toward and away from the pipe, ratchet means for controlling the movement of the slide, said ratchet means comprising a pressure screw journaled in and in thrust relation to the slide with a handle for turning the same and a pawl engaging the threads of the pressure screw and oriented to yield freely to forces on the pressure screw toward the pipe and to hold against forces on the pressure screw away from the pipe, and manually operable means for releasing the pawl from engagement with the pressure screw to permit movement of the pressure screw away from the pipe.

5. A pipe cutter comprising a C-shaped frame having pipe supporting rolls at one end of the frame and a slide in the other end of the frame, said slide having one end directed toward said rolls, a cutting wheel journaled in said one end of the slide, a pressure screw journaled in and having a thrust transmitting connection to the slide, said slide having a longitudial slot exposing a segment of the thread of the pressure screw, and a pawl with a threaded section engaging the threads of the pressure screw and oriented to yield freely to forces on the screw toward the rolls and to hold against forces on the screw away from the rolls, and means for retracting said pawl from said engagement with the pressure screw .

6. A pipe cutter having a frame with means for guiding the cutter for relative rotation with respect to the pipe in a plane perpendicular to the longitudinal axis of the pipe, a wheel having a cutting edge in said plane, a pressure screw in thrust relation to the wheel, a slide in thrust relation to the pressure screw and guided in the frame for movement toward and away from the pipe, and ratchet means between the frame and slide oriented to yield freely to forces toward the pipe and to hold against forces away from the pipe, spring means between the frame and slide for moving the slide away from the pipe, and manually operable means for releasing the ratchet means.

7. A pipe cutter having a frame with means for guiding the cutter for relative rotation with respect to the pipe in a plane perpendicular to the longitudinal axis of the pipe, a wheel having a cutting edge in said plane, a slide guided in the frame for movement toward and away from the pipe, spring means between the frame and slide for moving the slide away from the pipe, ratchet means for controlling the movement of the slide, said ratchet means comprising a pressure screw journaled in and in thrust relation to the slide with a handle for turning the same and a pawl engaging the threads of the pressure screw and oriented to yield freely to forces on the pressure screw toward the pipe and to hold against forces on the pressure screw away from the pipe.

8. A pipe cutter comprising a C-shaped frame having pipe supporting rolls at one end of the frame and a slide in the other end of the frame, said slide having one end directed toward said rolls, a cutting wheel journaled in said one end of the slide, a longitudinal groove in the frame presented to the slide, a coil tension spring in the groove having its forward end connected to the slide and its other end connected to the frame, a pressure screw journaled in and having a thrust transmitting connection to the slide, said slide having a longitudinal slot exposing a segment of the thread of the pressure screw, and a pawl with a threaded section engaging the threads of the pressure screw and oriented to yield freely to forces on the screw toward the rolls and to hold against forces on the screw away from the rolls, and means for retracting said pawl from said engagement with the pressure screw.

No references cited.